Figure 1:
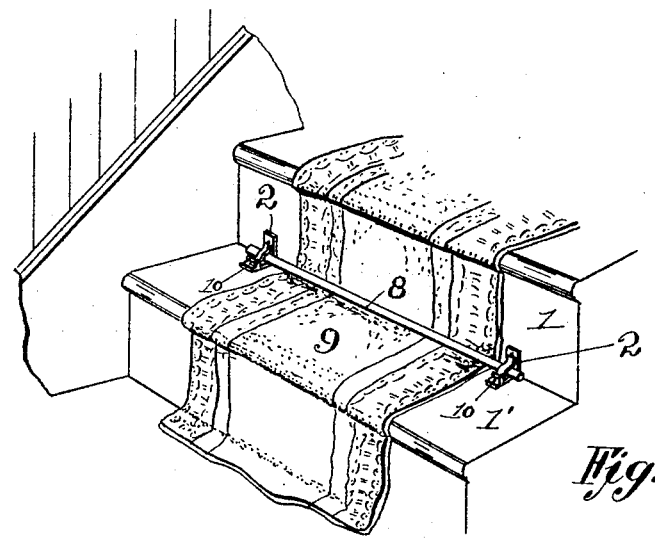

No. 805,307. PATENTED NOV. 21, 1905.
J. MALLEN.
ROD FASTENER FOR STAIRWAYS.
APPLICATION FILED JULY 3, 1905.

Witnesses.
C. A. Rudolph.
T. H. Butler.

Inventor:
John Mallen.
By N. C. Ewert & Co.
Attorneys.

UNITED STATES PATENT OFFICE.

JOHN MALLEN, OF CURWENSVILLE, PENNSYLVANIA.

ROD-FASTENER FOR STAIRWAYS.

No. 805,307. Specification of Letters Patent. Patented Nov. 21, 1905.

Application filed July 3, 1905. Serial No. 268,207.

*To all whom it may concern:*

Be it known that I, JOHN MALLEN, a citizen of the United States of America, residing at Curwensville, in the county of Clearfield and State of Pennsylvania, have invented certain new and useful Improvements in Rod-Fasteners for Stairways, of which the following is a specification, reference being had therein to the accompanying drawings.

This invention relates to certain new and useful improvements in rod-fasteners for stairways, and the invention relates more particularly to a device employed for detachably securing rods to a stairway for retaining a carpet or matting in position.

The primary object of the invention is to provide a simple and inexpensive fastener for rods employed for retaining carpet or matting upon a stairway, and in this connection I have devised a fastener adapted to be secured to the rise of a step whereby the rods which are secured to the steps by the fasteners can be removed at any desired time.

Another object of this invention is to provide a rod-fastener for use in connection with carpets on stairs in which a fastening member to penetrate through the carpet into the riser or tread of the stairs is dispensed with, and consequently any unseemly marks on the said riser or tread are obviated when the carpet is removed.

My invention further resides in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 2:
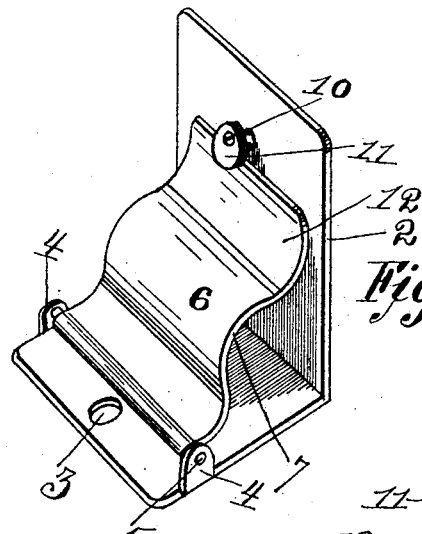
Figure 3:
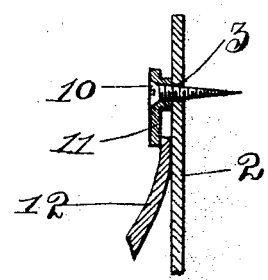
Figure 4:
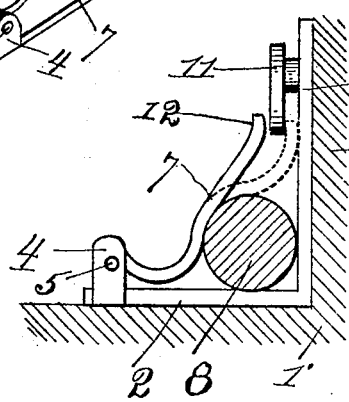

Figure 1 is a perspective view of a plurality of steps, illustrating my improved fastener applied to one of the steps and retaining a rod and carpet in position. Fig. 2 is a perspective view of the fastener. Fig. 3 is a detail sectional view of a portion of the same; and Fig. 4 is a side elevation of the fastener, showing the rod 8 in section.

To put my invention into practice, I employ two fasteners for each step, the fasteners being preferably secured to the riser 1 and the tread 1' of a step, and as each fastener is identical in construction it is only necessary to describe one of said fasteners.

The fastener proper consists of an L-shaped or angle-shaped plate 2, the ends of which are provided with apertures 3 3, which are employed to receive means, such as screws, for securing the plate to the step. Adjacent to the lower end of the plate 2 I provide upwardly-extending pierced lugs 4 4, between which is mounted a rod or pin 5. To this rod or pin is attached a resilient clip 6. The one end of the clip is bent to surround the rod or pin 5 and the clip proper is preferably bent upon a compound curve, the curved portion 7 of the clip being adapted to embrace the one end of a rod 8 employed for retaining the carpet 9 upon the steps.

Screws 10 10 are employed at both ends of the plate to hold the same in engagement with the riser 1 and the tread 1' of the steps, the uppermost screw also retaining the securing-button 11 in positon upon the plate 2, the securing-button being employed to secure the upwardly-curved end 12 of the resilient clip in engagement with the plate 2. The securing-button 11, it will be observed, is eccentrically mounted on the upper screw 10, thus affording a depending tip between which and the vertical member of the plate 2 the upper end of the clip 6 is received.

When my improved fasteners are placed between the angularly-disposed sides of the steps upon each side of the carpet 9, the spring-clips 6 are adapted to engage the ends of the rod 8. In Fig. 4 of the drawings I have illustrated the position of one of the spring-clips 6 upon the rod 8 prior to having its end engaged under the securing-button 11, and it will be observed that when the curved end 12 of the clip 6 is bent downwardly and moved under the securing-button 11 it will be firmly held in engagement with the rod 8. It will thus be seen that to remove the rod 8 and the carpet from the steps it is only necessary to move the spring-clip 6 out of engagement with the securing-buttons 11, at which time the spring-clips can be swung rearwardly sufficient to permit of the rod 8 being removed.

I may so construct the securing-buttons 11 that they can be slightly rotated—that is, swung around upon their pivotal points, which in this instance is the upper screw 10—whereby the resilient clips 6 will be released, it only being necessary to depress the curved ends 12 of the clips and swing the securing-buttons 11 back into alinement with the same, when it is desired to fasten the rod to the plate 2.

I preferably construct my improved rod-fastener of a strong and durable metal, which will withstand rough usage to which this type of fastener is subjected at times by persons using the steps.

It is thought from the foregoing that the construction, operation, and advantages of the herein-described rod-fastener will be apparent without further description, and various changes in the form, proportion, and minor details of construction may be resorted to without departing from the spirit of the invention or sacrificing any of the advantages thereof.

What I claim, and desire to secure by Letters Patent, is—

1. A stair-rod fastener comprising a plate having angularly-disposed integral members, each provided with an opening, screws passed through said opening to engage respectively the riser and tread of a stair, and lugs carried by the lower member near its outer end, a pin mounted in said lugs, a spring-clip having one end wrapped on said pin, said clip adapted to engage a stair-rod, and a button carried by the screw which secures the upright member of said plate to the riser, and having a lip to engage the upper end of said spring-clip.

2. A stair-rod fastener comprising a plate having integral angularly-disposed members, a spring-clip pivotally secured to the lower of said members and adapted to engage and bind against a stair-rod placed between said clip and the plate, a screw passing through the upright member of said plate into the riser of a stair and securing said plate to the stairs, and a button eccentrically mounted on said screw and engaging the upper end of said clip to bind the same in engagement with said stair-rod.

In testimony whereof I affix my signature in the presence of two witnesses.

JNO. MALLEN.

Witnesses:
O. C. STEAR,
ALLEN ROOM.